Oct. 26, 1971 E. A. NORDELL 3,614,871
METHOD APPARATUS, AND DOCK MEMBER COMPONENTS FOR
ERECTING, ALIGNING, REALIGNING, OR
DISASSEMBLING A DOCK MEMBER
Filed June 14, 1968 2 Sheets-Sheet 1
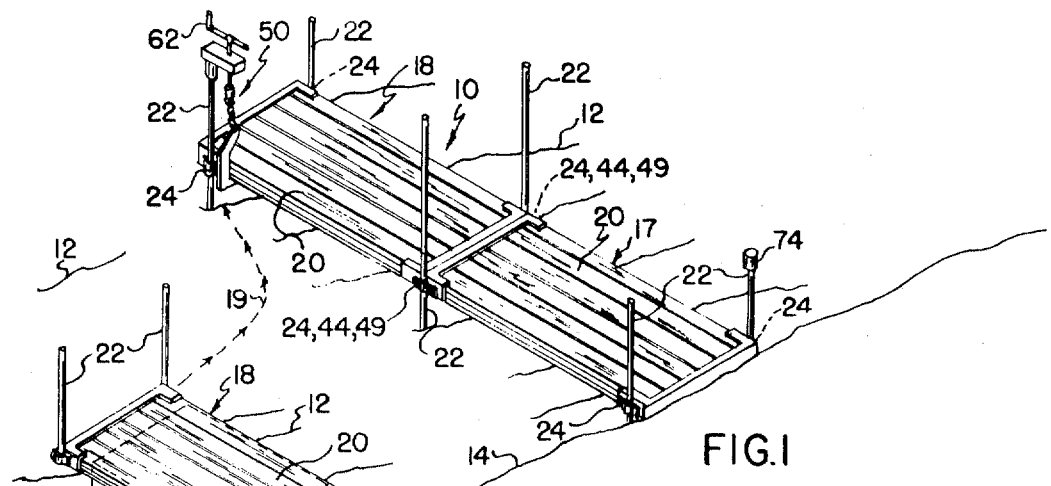
FIG.1
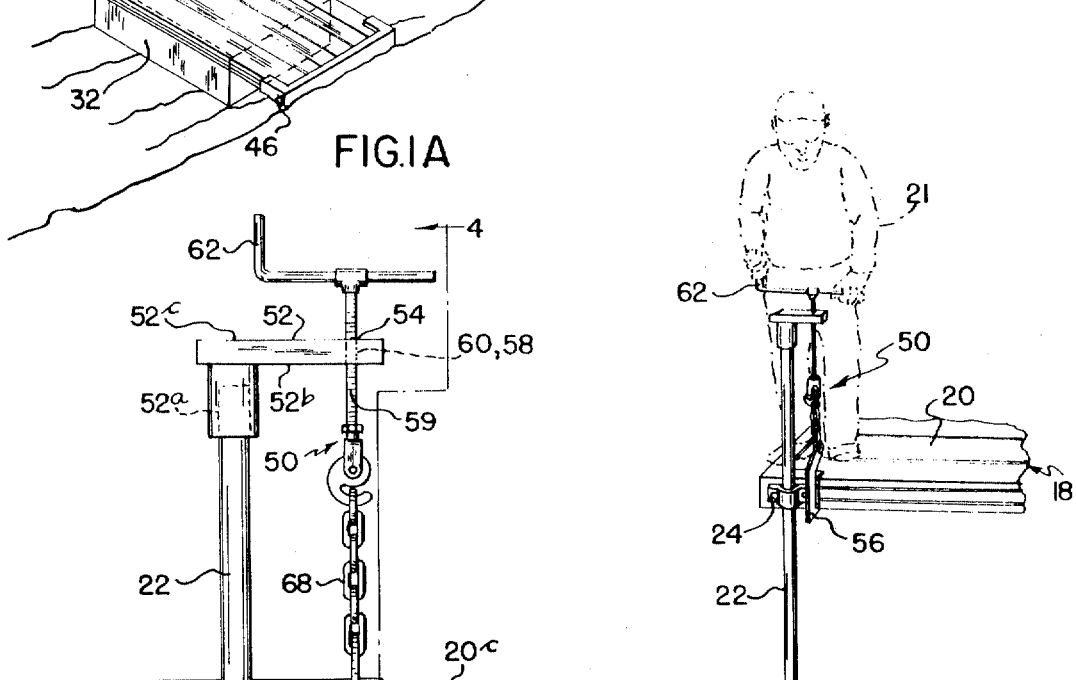
FIG.1A
FIG.2
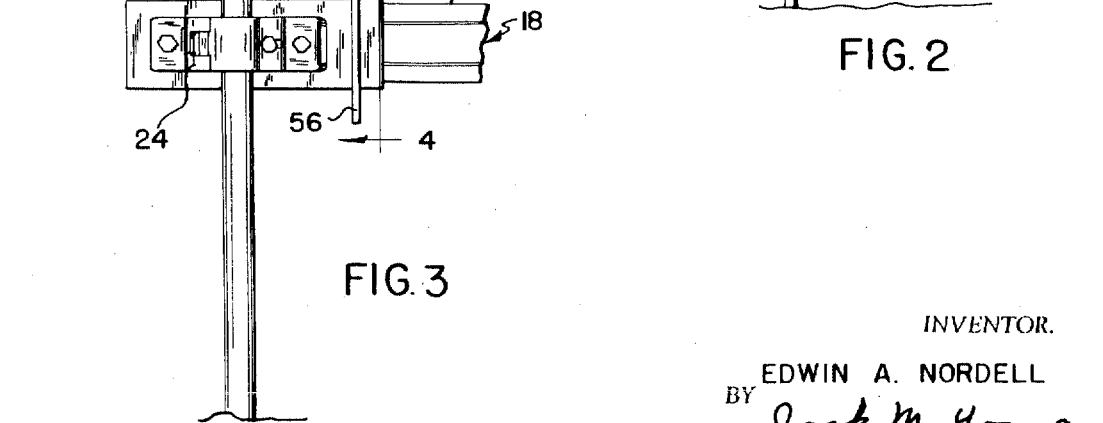
FIG.3
INVENTOR.
EDWIN A. NORDELL
BY Jack M. Young
ATTORNEY Oct. 26, 1971          E. A. NORDELL          3,614,871
METHOD APPARATUS, AND DOCK MEMBER COMPONENTS FOR
ERECTING, ALIGNING, REALIGNING, OR
DISASSEMBLING A DOCK MEMBER
Filed June 14, 1968                    2 Sheets-Sheet 2

*INVENTOR.*
EDWIN A. NORDELL
BY
Jack M. Young
ATTORNEY

३,६१४,८७१
METHOD APPARATUS, AND DOCK MEMBER COMPONENTS FOR ERECTING, ALIGNING, REALIGNING, OR DISASSEMBLING A DOCK MEMBER

Edwin A. Nordell, Lyndhurst, Ohio, assignor to The Metal Craft Company, Chardon, Ohio
Filed June 14, 1968, Ser. No. 737,159
Int. Cl. E02b 3/20
U.S. Cl. 61—48    5 Claims

ABSTRACT OF THE DISCLOSURE

Method, apparatus and dock member component or components for erecting, disassembling, aligning and/or realigning a dock member easily erectable (as a complete dock, a modular dock component, or an extension of on an existing dock) by a single person even in deep water without the use of boats and without getting wet; and including a dock deck elevator, dock member post clamp bracket, a connector for operatively connecting two dock members, and/or combination member connector and post clamp bracket, etc.

BACKGROUND AND SUMMARY OF THE INVENTION

This invention relates to docks, whether made up of a single dock member or a plurality of dock members in any selected alignment, and relates especially to easily erectable docks and dock members.

A brief description of one way of erecting a prior art dock member may be helpful in better understanding the advantages of the present invention. A dock member, comprising deck 20 (mentioned here as only one example of a suitable deck and not as prior art since the specific deck 20 shown is part of my copending patent application, as mentioned hereafter) and posts 22, to be described hereafter in the present invention, have been used here for purposes of explanation of the prior art. Four posts 22, one secured to each corner of deck 20 by a conventional strap type clamp, can be used on deck 20 with each post 22 extended approximately the distance below deck 20 expected to be needed in the erected position shown in FIG. 1. Then, at least four men, one at each deck corner (and possibly eight or more men, four on each side if the dock member is heavy) wade out into the water and place the dock member in proper position. If any of the posts have to be driven into the river or lake bottom, suitable scaffolding must be provided at each post to permit driving the top thereof with a sledge hammer. Alternatively, two men in a boat, one guiding or paddling the boat and the other swinging a sledge hammer while standing in the boat may drive in each post 22 if the top thereof is not too far above water level. After all four posts 22 have assumed a proper vertical position, it is necessary to align deck 20 and move it into its final erected position. Now, at least the four men, one in each corner, loosens their post strap clamps and move their corners of deck 20 up or down to move the top surface of deck 20 into its erected and aligned position, such as level, with respect either to the ground or to the top deck surface of any other associated dock member. When this final erected position is reached, each man then must tighten his strap clamp to secure his post 22 in position before wading back towards shore. Then, this procedure must be repeated for each dock member. It should be apparent that at best this procedure is only good for erecting a dock in shallow water; if deep water erection is desired, it might be necessary to have four boats, one at each corner of deck 20 and filled with men, to provide the erection.

Erection and alignment of a prior art dock generally requires a plurality of men, a whole crew, working either in boats or in the water surrounding the dock. This can cause great expense and inconvenience to someone erecting and aligning a dock on a minimum budget, such as a week-end type, lake or water resort cottage or cabin dweller who normally lives in a home in a city many miles away from the resort. He may not yet own a boat or may be erecting the dock solely for swimming or fishing purposes with no intentions of buying or renting a boat. Requiring an erection and alignment crew means that he must either pay a large labor charge or invite many friends out for the week-end to help him around the cottage or cabin, which might be too small to house them. He would have to go to the same inconvenience and expense whether he was building a full dock, adding an extension to his existing dock, aligning or realigning a dock, repairing his existing dock, disassembling or taking in an existing dock in the fall to avoid winter ice and high spring waters or flood waters and subsequently re-erecting and realigning the dock, etc.

The present invention permits a single man 21 to erect and to align a complete dock, or to add an extension to an existing dock, while working alone and without having the inconvenience or expense of a boat, dock erection helpers, wading or swimming in the water around the dock, or getting wet. He also will not have these inconveniences or expenses if he finds it necessary to realign the dock, or any component dock member thereof, as to location or heighth after misalignment caused by swift current, settling, ice, etc.; or if he finds it necessary or desirable to disassemble and bring in the dock, or any component dock member thereof, in the fall or before flood to protect the dock from damage and subsequently re-erect and realign it in the spring or after the flood.

An object of the present invention is to provide a method and apparatus for erecting, aligning or realigning of the dock member as a component part of a dock or as a complete dock.

A further object of the present invention is to provide a connector between component dock members of the dock adapted to permit easier assembly, erection, alignment, realignment or disassembly of the component members and to permit misalignment to occur therebetween during dock usage by settling.

A further object of the present invention is to provide a combined dock member connector component and post clamp bracket providing a plurality of advantages.

A further object of the present invention is to provide a method or apparatus for erecting a dock member or members, or a component of a dock, characterized by ease of assembly, erection and take down of component parts and docks members; structural simplicity; inexpensive construction; compactness on disassembly for shipping; strong and sturdy nature; ease of operation or use; multiplicity of functional advantages for some component parts; etc.

These and other objects, novel features and additional advantages of the present invention will become more clearly apparent by reference to the appended claims as the following detailed description and discussion proceeds in conjunction with the accompanying drawing.

BRIEF DESCRIPTION OF THE DRAWING

In the drawing,

FIG. 1 is a perspective view of two connected together, erected and aligned dock members having thereon apparatus and component parts of the present invention;

FIG. 1A is a perspective view of a dock member being moved on a float at shore before being moved into intermediate and subsequently erected positions during dock member erection;

FIG. 2 is a perspective view showing the dock deck elevator of the present invention in use;

FIG. 3 is an enlarged, side elevational view of a portion of FIG. 2 of the dock deck elevator;

DETAILED DESCRIPTION OF THE PREFERRED EMBODIMENTS

Figure 5:
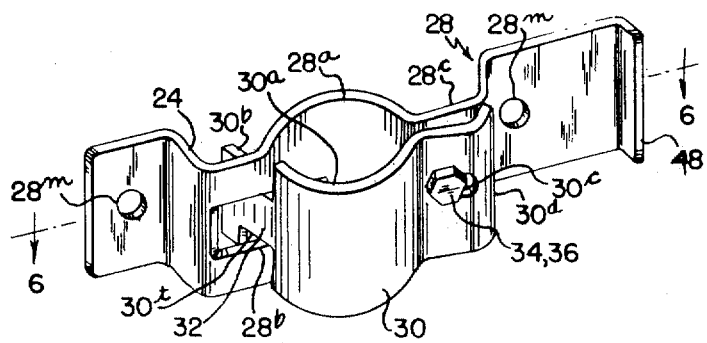
FIG. 5 is a perspective view of the combined connector component and post clamp bracket part of the present invention.

Dock 10 in FIG. 1 is shown erected in water 12 (such as a lake, river, etc.) extending out from shore 14. Dock 10 may comprise one or more dock members, here shown specifically as interconnected dock members 17 and 18 as dock modules in erected and aligned position with the top surfaces in FIG. 1 of their decks 20 aligned coplanar for walking on dock 10.

Each dock member 17 or 18 includes deck 20 of any suitable form (such as that shown by deck portion 16 in my copending U.S. patent application Ser. No. 721,386, filed Apr. 15, 1968, an entitled "Dock Structure" to which further reference may be made, and the disclosure of which is incorporated herein by this reference to that pending patent application); and supporting posts 22 clamped to one or more edges of deck 20, each by a dock member post clamp bracket 24 secured to deck 20 by bolt and nut units 26. An "edge" of deck 20 is defined as including a side, end, or corner of deck 20. Some aspects of this invention are obtainable if only one post 22 supports only one end edge of a dock member.

Four brackets 24 and posts 22 are on dock member 17, and two brackets 24 and posts 22 are on dock member 18 in FIG. 1.

Dock 10 may comprise dock members 17 and 18 in any desired final alignment, including T formation, straight line (shown in FIG. 1), standing alone, etc. with their (or its) top, deck, walkway surfaces in any desired alignment including level, uphill, downhill, one level and the other uphill or downhill, uphill and downhill, arranged in step-like formation at their abutting ends in FIG. 1, etc. "Align" or "realign," or any variation of these words as used herein, include not only any of these final alignments mentioned heretofore in this paragraph but also in a broad sense any partially aligned or partially erected positions (located between completely disassembly and fully erected and finally aligned position), such as (1) when one outer corner edge of deck 20 has been raised into level position in the twelfth and thirteenth erection steps (these erection steps being described hereafter) but the other corner has not yet been raised to level position by the fifteenth erection step, or (2) just before or after engagement of connector components 46 and 48 in FIGS. 7 and 8 during assembly (in the fourth erection step) or disassembly or dock members 17 and 18. Even a partially aligned or erected position is a selected position of alignment which the dock members occupy on their way into finally aligned position. It should be apparent that even a single dock member 17 or 18 may be aligned, realigned, erected or disassembled since these functions are being performed relative to the ground bottom below body of water 12, eventhough a second dock member is not involved. "Realigning" includes moving a dock member either back to its original alignment or into a new alignment now desired.

Each post clamp bracket 24 is constructed to permit vertical movement of its post 22 relative to deck 20 so that each post may be moved from a retracted position shown in FIG. 1A into dock member supporting position in the erected and aligned dock member position shown in FIG. 1.

Each bracket 24 includes base element 28 secured by two pairs of bolt and nut units 26 through holes 28m to the edge of its associated deck 20 and having arcuate recess 28a between its ends; and includes post gripper element 30 having corresponding arcuate recess 30a between its ends with each arcuate recess being less than a semi-circle.

Each bracket 24 also includes a pair of disengageable connecting means 32 and 34, detachably connecting elements 28 and 30 together with one of these connecting means being located on each side of recesses 28a and 30a so that recesss 28a and 30a are associated to embrace the associated dock post 22 by a clamping action.

Connecting means 32 comprises an easily assemblable hinge means provided a fulcrum during clamping or pulling elements 28 and 30 into clamping relationship on their associated posts 22 by tightening connecting means 34, comprising a screw and nut type connector having bolt 36 and nut 38. Hinge or connecting means 32 has T-shaped tongue 30b on element 30 adapted to have its tank 30t slidably held within slot 28b in element 28 elongated in a plane transverse to associated post 22. Also, bolt 36 has its shank 36a extending through slot 30c in element 30 elongated in the same transverse plane and the threads on its shank screwed into nut 38 welded or otherwise secured in the concave portion of hump 28c on element 28 while the cross bar of T-shaped tongue 30b is located within the concave portion of hump 28d of element 28 so as to have sufficient clearance under hump 28d to provide a free hinging action without interference by deck 20. It should be apparent that when bolt 36 is disengaged from nut 38, the cross bar of tongue 30b may be detachably disengaged from or assembled into slot 28b in the position shown in FIG. 5 by merely rotating the plane of T-shaped tongue 30b about an axis (generally being the vertical, central axis of the T) until this plane coincides with one of the diagonals of slot 28b to permit moving the cross bar of the T-shaped tongue 30b through slot 28b since slot 28b has sufficient length (in the plane transverse to its associated post 22, as viewed when assembled therewith, as shown in FIG. 3) to permit this action when clamp bracket 24 has neither bolt 36 nor post 22 assembled therewith. Hence, elements 28 and 30 will be held together by T-shaped tongue 30b of hinge means 32, even when bolt 36 is removed, to prevent loss of loose element 30, such as by dropping in the water, when bracket 24 is thus in the unclamping position. Also, the only loose part is bolt 36 since nut 38 is welded in the concave portion of hump 28c, and therefore only bolt 36 need be tightened (when clamping post 22 in bracket 24) for simplicity of operation. Recesses 28a and 30a embrace, and tightly clamp, post 22 in the position shown in FIGS. 3 and 6.

It should be apparent that when bolt 36 is loosened, its associated post 22 may be raised or lowered relative to its associated deck 20 by telescoping through embracing recesses 28a and 30a; and if all bolts 36 on that particular deck member are loosened, the whole deck 20, for example, may be raised or lowered to different erected positions in FIG. 1.

If desired, connecting means 32 may be made the same as connecting means 34, namely of bolt 36 and nut 38; but hinge 32 is the preferred construction since then only bolt 36 need be tightened.

If bracket elements 28 and 30 and post 22 are made of aluminum, a stainless steel insert may be used therebetween to prevent freezing of aluminum against aluminum, but such stainless steel insert is not required with the present construction of clamp bracket 24 since each recess 28*a* and 30*a* is less than a semi-circle and extends less than 180° around its associated post 22 so that these recesses 28*a* and 30*a* will have no tendency to lock up on post 22 since recess 30*a* can be pealed off post 22 after screw 36 has been loosened and post 22 can be laterally pulled out of recess 28*a*.

Lip 30*d* on element 30 bears on the top surface of element 28 above hump 28*c* so that tightening bolt 36 will cause lip 30*d* to act as a fulcrum and bend element 30 intermediate its ends (because of the space between elements 28 and 30 around bolt shank 36*a*) for pulling recess 28*a* toward recess 30*a* to more tightly secure post 22 therebetween. Elongated slot 30*c* permits this movement.

ERECTION, ALIGNMENT, REALIGNMENT OR DISSASSEMBLY OF ONE OR MORE DOCK MEMBERS 17 AND 18

Since erection of dock member 18 is best illustrative of the present invention, the major portion of the following description will be directed to the erection of dock member 18 as an additional dock member or an extension on existing and earlier erected dock member 17. Then, a brief comment will be given near the end of this description on how this same erection method could have been used earlier to erect dock member 17. The description will be primarily directed to the method steps for erecting and aligning dock member 18 and coupling or connecting this additional dock member 18 to existng dock member 17 wth the top surfaces of their decks 20 aligned and with each in erected and aligned position; and the apparatus and/or dock structure comprising connectors 34 for connecting additional dock member 18 to existing dock member 17 with their deck surfaces thus aligned in erected and aligned position, deck elevator 50, and dock member post clamp brackets 24 either for raising or lowering into, or for permitting raising or lowering into and clamping in, the erected and aligned position shown in FIG. 1 deck 20 of addtional dock member 18 relative to its two outermost deck supporting posts 22. It will be apparent that these method steps (or the reverse thereof), apparatus or dock components, or suitable components thereof, can be used to erect, align, realign or disassemble one or more dock members in any selected alignment.

Now will be described sequentially and by numbers the steps of erecting, assembling, or aligning dock member 18 from disassembled position through different partially erected, aligned and intermediate positions. However, it should be apparent that generally the reverse of this described sequence can be used by one man to disassemble and return to shore all components of dock member 18 by going through generally these same partially erected, aligned and intermediate positions to disassembled position. It will be apparent, as the description proceeds, that one man, working alone can erect or assemble, and may subsequently disassemble or take down, dock member 18 even in deep water, without a boat, and without getting wet.

Dock member 18 is erected and aligned by the erection and alignment steps given hereafter.

Figure 6:
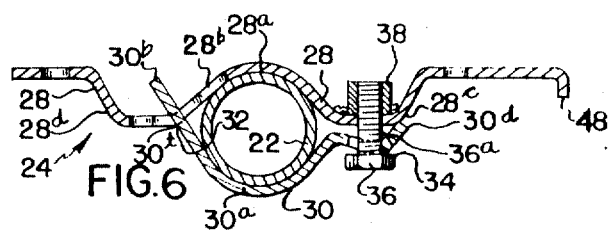
FIG. 6 is a horizontal sectional view taken generally along the line 6—6 in FIG. 5 with this clamp bracket clamped on a dock post.

First, two posts 22 in FIG. 1A are secured to deck 20 in their post elevated or retracted position shown in FIG. 1A while deck 20 is on shore 14 in this partially erected and aligned position. Each post 22 is telescoped into coacting recesses 28*a* and 30*a* of its associated post clamp bracket 24, and then its associated bolt 36 is tightened to clamp the post, as shown in FIGS. 1A and 6.

Now, dock member 18 is moved by man 21 into an intermediate, partially erected, or aligned position generally vertically aligned with the erected and aligned position thereof shown in FIG. 1 and with both posts 22 at the outer end of dock member 18 outwardly extended by going through the hereafter described second, third, fourth, fifth and sixth steps.

Second, additional dock member 18 is placed on float or float means 32 in water 12 to support floatingly dock member 18 in this partially erected and aligned position. Float 32 may be a solid, right parallelepiped in peripheral shape, floatable plastic foam block 32 (such as polystyrene, commonly bearing the trademark Styrofoam) or of other suitable floatable material.

Third, dock member 18 is floated along path 19 from FIG. 1A to FIG. 1 into an intermediate or partially erected and aligned position ready for final erection into the erected position shown in FIG. 1 by float 32 located under deck 20 thereof. This can most easily be done by man 21 guiding floating dock member 18 over toward the edge of dock member 17, walking out on dock member 17, and then guiding dock member 18 to approximately the position shown in FIG. 1 while standing, kneeling or sitting on dock member 17. Alternatively, the dock erector can climb out onto the top surface of floating deck 20 of dock member 18 in FIG. 1A and guide dock member 18 as a raft out into this position by either paddling or pulling along the edge of dock member 17. However, this procedure is not preferred because it would require a larger float 32 to support the full weight of the erector.

Figure 7:
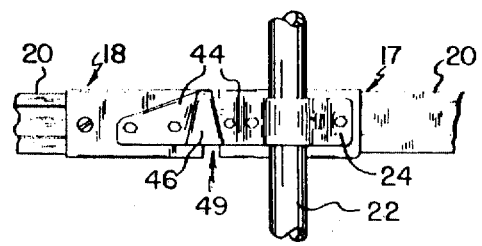
FIG. 7 is a side elevational view of the part in FIG. 5 operatively connecting a dock member deck and one of its supporting posts and aligned for assembly with the other dock member connector component shown slightly above and to the left thereof.
Figure 8:
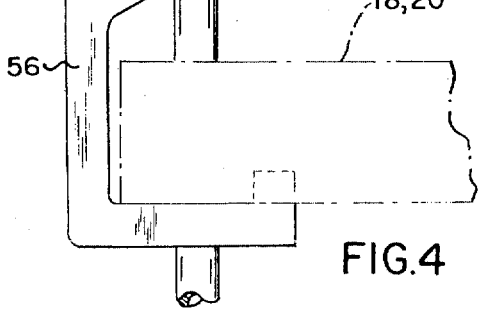
FIG. 8 is a side elevational view of FIG. 7 with the connector components assembled to align the decks of the now connected dock members.

Fourth, additional dock member 18 is connected by a pair of connectors 44 in FIGS. 7 and 8 to existing dock member 17 with their decks 20 aligned in a partially erected and aligned position for movement into the erected and aligned position shown in FIG. 1.

A pair of (two) connectors 44 are provided with one connector 44 located at each side of dock members 17 and 18 and with these connectors stradding the abutting ends of members 17 and 18 in the middle of dock 10 in FIG. 1. This pair of connectors 44 is made up of a left hand connector and a right hand connector, being mirror images of each other, with only left hand connector 44 being specifically shown in FIGS. 7 and 8. Each connector 44 has a socket connector component 46 bolted to the side of dock member 18 near its inner end and an ear connector component 48 formed as an integral part of post clamp bracket base element 28 at the outer end of dock member 17.

It should be apparent now to dock erector 21, kneeling on deck 20 at the outer end of dock member 17, may couple to the supported outer end or edge of existing dock member 17 the inner end or edge of additional dock member 18 (remote from its two outer supporting posts 22 in FIG. 1) by raising the inner end or edge of dock member 18 and detachably engaging downwardly open socket 46*b* of connector component 46 over ear connector component 48 in each connector 44.

Each connector 44 has sufficient clearance between the inter-connected surfaces of its socket 46*b* and ear 48 to provide a free knee-action in the up or down direction (in a plane extending generally perpendicular to the top or walkway surface of their decks 20 and extending in the same direction as the lengths of these decks 20 in FIG. 1) but not sideways, so that a limited relative movement or misalignment of decks 20 on dock members 17 and 18 in FIG. 1 can occur without damage, and so that additional dock member 18 can be more easily erected, aligned, realigned or disassembled whenever desired. This knee-type action coupling by connectors 44 permits raising and lowering of the outer or post end of deck 20 of additional dock member 18 by deck elevator 50, as will be described hereafter in the twelfth step hereafter described in the dock erection method. This knee action permits an easier installation, alignment or erection; permits easier subsequent disassembly or removal of dock member 18; permits uneven settlement of dock members 17 and 18 during use of the dock without breaking connector components 46 and 48 or doing damage to dock members 17 and 18; and permits easy realignment of dock members 17 and 18.

Now, it should be apparent that two combined parts 49 are provided, one on each side of dock 10 where the ends of dock members 17 and 18 abut, with each of these parts 49 being of simple construction, having both one post clamp bracket 24 and one connector 44 therein, while having only one element 28 and socket component 46 respectively secured to different dock members 17 and 18. This simple construction results from having ear component 48 formed as an integral part of one end of base element 28 of post clamp bracket 24.

Fifth, each of the two outermost posts 22 on dock member 18 is dropped into ground engagement below water 12 in the position in FIG. 1 by unclamping its associated post clamp bracket bolts 36 and moving, or permitting to move, each post 22 telescopically through its clamp bracket 24 down into the ground engagement into generally the position shown in FIG. 1 in this partially erected and aligned position. This step is performed by having the dock erector walk out on deck 20 of dock member 18, since it is still supported by float 32.

Sixth, each of these two posts 22 is reclamped by retightening its clamp bolts 36 after the bottom of each post 22 is in bottom engagement under water 12 in this partially erected and aligned position. Clamping post 22 in ground engagement is desirable now so that there will be no danger of any accidental dropping or tilting of the outer end of dock member 18 any great distance after float 32 has been removed in the tenth step described hereafter.

If dock member 18, which is preferably made of aluminum, is not too heavy or too long, it may be possible to swing it out over the outer end or edge of dock member 17 into this intermediate position while skipping the aforesaid second, third, fourth, fifth and sixth steps. Then, it would be necessary to extend both posts 22 on member 18 to approximately the erected position depth and reclamp them, as set forth in part of the sixth step, while dock member 18 was still on shore 14; and it would be necessary to engage sockets 46b with ears 48 after dock member 18 were thus outwardly extended into the intermediate position. However, it should be readily apparent that this method of erection of dock member 18 has substantial practical limitations as to weight and size of dock member 18 for ease of handling, as the judging accurately the required downward projection of support posts 22 if water 12 varies in depth, etc.

Figure 4:
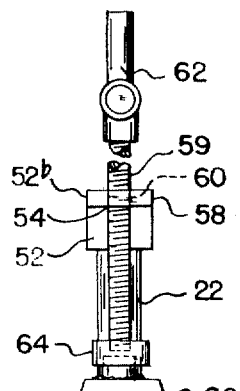
FIG. 4 is an enlarged view of the deck elevator with portions broken away, with the top operating crank turnable, taken generally along the line 4—4 in FIG. 3, and showing a portion of the deck outline in dot dash lines.

Seventh, dock deck elevator 50 is attached to one post 22, such as left hand outermost post 22 in FIG. 1 (with further detail shown in FIGS. 2–4), and to deck 20 for subsequently raising or lowering dock deck 20 relative to this supporting post 22 for moving deck 20 of dock member 18 into the erected and aligned position shown in FIG. 1.

Deck elevator 50 includes suitable dock post bracket part 52 with securing means for detachably securing this bracket part to associated post 22, and includes elevating means 54 operatively connected to bracket part 52 and detachably connectable with deck 20 of dock member 18 by hook part 56 so that elevating means 54 can move this deck 20 into the erected and aligned position by raising or lowering deck 20 contiguous to this post 22.

This securing means is specifically shown herein as blind hole socket 52a on post bracket part 52 telescopically slidable over the top of post 22 for detachable securement therewith and permitting removal, as will be described in more detail hereafter in the fourteenth step, to put on top of other post 22.

Elevator 54 includes hook 72 having a sufficiently wide mouth to be detachably hookable under, or engageable with, deck 20 and operatively connected to bracket part 52 by screw and nut connector 58, comprising screwed together screw 59 and nut 60 being a threaded hole in arm 52b of bracket part 52; operating or rotatable crank 62 secured to the top of screw 59; and swivel 64 connected between the lower end of screw 59 and the upper end of clevis 66, and chain 68 connected at its lower end to hook part 56 and at its upper end by hook 72 secured by nut and bolt unit 72 to the bifurcated lower end of clevis 66 welded to swivel 64 so that these component parts 64, 66, 68, 70 and 72 of elevating means 54 are operatively connected between hook part 56 and screw 59 of connector 58. Then, it should be apparent that rotating crank 62 about the vertical axis of screw 59 will either raise or lower hook part 56 and deck 20, if it is free to move, depending on the rotation of crank 62, while not requiring post bracket part 52 or hook part 56 to pivot relative to each other about either a horizontal or vertical axis during relative rotation of screw 59 and nut 60. It should be apparent that this invention includes within its scope the location of one or both swivel 64 and clevis 66 between post bracket part arm 52b and nut 60 if nut 60 were a separate component.

Different shape or size hook parts 56, adapted to fit different decks 20, and their associated chains 68 may be interchanged in deck elevator 50 by interchanging their top link of chain 68 on hook 72.

Hence, this seventh step for attaching deck elevator 50 to post 22 and deck 20 involves telescoping post bracket part socket 52a down over the top of associate post 22 and engaging hook part 56 under deck 20 contiguous thereto in any suitable manner, such as by first disengaging the top link of chain 68 from hook 72 to permit easier engagement of hook part 56 with deck 20 and then reengaging this link on hook 72.

Eighth, after crank 62 is turned to pull hook part 56 tightly up into engagement with the outer left end of deck 20 to take up any slack therebetween, post clamp bolt 36 at the outer left deck end may be loosened to loosen its post 22 to permit vertical relative movement with respect to deck 20 of dock member 18 but with this bolt 36 not loosened sufficiently to open substantially its post clamp bracket 24. In any event, it is necessary here to be sure that at least the left hand post 22 at the outer end of the dock in FIG. 1 be free to snugly slide vertically in its clamp 24.

Ninth, the left outer end of deck 20 of dock member 18 is raised upwardly by having deck erector 21 turn crank 62, as shown in FIG. 2, to free this deck 20 of floating support by float 32 in this partially erected and aligned position.

Tenth, float or float means 32 is removed from under deck 20 of additional dock member 18 by the dock erector lying on the top of this deck and reaching under the deck to pull out this light weight float 32.

Eleventh, any selected one or both outermost posts 22 may be driven into the bottom of lake or river 12 if necessary by having the dock erector either jump up and down on the outer end of deck 20 of dock member 18 adjacent the selected post to be driven or by hitting the top of the selected post with a sledge hammer while standing on deck 20. To protect the top of the post during sledge hammer driving, it is desirable to mount thereon post cap 74, as shown at the right hand end of FIG. 1, having a blindhole socket telescoped over the top of the post or by hitting the top surface 52c of post bracket part 52 directly over the top of the selected post. Generally, it is not necessary to drive down any post 24 except the two posts on the right end in FIG. 1. Weight of dock member 18 on one post when deck elevator 50 is used, such as in the twelfth or fifteenth erection steps, will usually perform this post driving function.

Twelfth, the left outer end, edge or corner of deck 20 is raised or lowered in FIG. 1 by deck elevator 50 relative to its left hand supporting post 22 in its dock member supporting position into a partially erected and aligned position by moving left hand portion of deck 20 toward, and preferably into, its aligned and erected position, such as a level position or any other erected or aligned position of any suitable or selected inclination.

Thirteenth, post clamp bolt 36 in the left hand outer end edge of dock 10 in FIG. 1 is tightened to reclamp left hand outermost post 22 tightly to its deck 20 in this partially erected and aligned position for deck 20.

Fourteenth, deck elevator 50 is removed from left hand outer post 22 by turning crank 62 in the direction to lower hook part 56 and then telescoping socket 52a up off the top of post 22.

Fifteenth, the right hand outer end, edge or corner of deck 20 is moved into finally erected and aligned postition, such as a level postition, by repeating on the right hand outside end post 22 the seventh, eighth, eleventh, twelfth, thirteenth and fourteenth aforedescribed steps while unclamping in the eighth step and reclamping in the thirteenth step this right hand outermost post on dock member 18 by its post clamp bolt 36 (instead of the outer left hand post and its bolt) with this post in its dock member supporting position so as to be able to support deck 20 in the erected and aligned position after elevator 50 is removed.

It should be apparent that if the outer end edge of the dock member is supported by only one post 22, this fifteenth erection step is not needed.

If the required vertical movement of either the left or right hand outer end of deck 20 on dock member 18 is too great and only one deck elevator 50 is being used, it may be necessary to go through the aforesaid seventh, eighth, twelfth, thirteenth and/or fourteenth steps several times for both the left and right outer dock ends to reach by a step-wise movement the desired erected and aligned position, or level, of each while avoiding bending of any of the outer end posts 22 by making too great a vertical movement of any one outer corner of this dock 10 at any one particular time.

It should be apparent that on bigger dock installation jobs, such as where saving in erection time is more important than the additional cost of another deck elevator 50, it would be desirable to use two deck elevators 50 at the same time, one on each post 22 on the outer end of corners of dock 10 in FIG. 1 in performing the aforedescribed seventh through fourteenth steps so as to eliminate the fifteenth step and any necessity for moving the single deck elevator 50 between two posts 22, as mentioned in the preceding paragraph, to engage with same post 22 more than once since the step-wise movement on the outer end of deck 20, as described in the preceding paragraph, need not be made because the outer end of deck 20 can now be moved directly to the desired erected and aligned position without disengaging two elevators 50 from these two posts 22. When using these two elevators 50, both post clamp bolts 36 associated with these two posts 22 are loosened into unclamping or moved into clamping position simultaneously, as may be required by the aforesaid eighth or thirteenth steps. If two dock erectors are working, both deck elevator cranks 62 may be rotated simultaneously to rapidly move outer end of deck 20 to the desired erected position, but if only one dock erector is involved, he may find it desirable to either try to turn both cranks 62 simultaneously, if deck 20 is narrow enough to permit him to reach both cranks, or rotate the cranks sequentially to move the left and right outer ends of deck 20 in step fashion to the desired erected and aligned position, basically the same as in the aforedescribed twelfth to fifteenth steps but without requiring removal and reattachment of a single elevator 50 repeatedly between the two outer posts 22.

It should now be apparent that dock member 17 could have been erected by following the same method steps, or suitable modification thereof, as aforedescribed for erecting dock member 18. However, the aforedescribed fourth step of connecting dock members 17 and 18 together by connectors 44 is not required. Then, the right end of dock member 17 can be secured to shore 14 in any suitable manner. If the right end of dock member 17 is to be secured to shore by some other method, such as a connection to a retaining wall, such connection can be tightened or made now. If right end posts 22 in FIG. 1 are to be used, they may be anchored by performing the step mentioned in the next paragraph.

Two posts 22 on the right hand, or shore, end of dock member 17 in FIG. 1 should now have their post clamp bracket bolts 36 loosened, be driven down into shore 14 by a sledge hammer striking the aforesaid post cap 74 telescoped over the top of the post to prevent damage thereto and be tightened by clamp bolts 36 to lock securely the shore end posts 22 to deck 20 of dock member 17. Since the dock member 17 had been earlier moved into level or erected position, shore end posts 22 can now be properly driven without putting undue strain on their post brackets 24.

After dock 10 is installed, it should be apparent that if either dock member 17 or 18 has settled, and especially if settling has been uneven, it is possible to quickly correct this settled condition by realigning members 17 and 18 to bring the effected dock member or members back into the proper erected and aligned position by using one or more deck elevators 50 as a dock realigning means. The knee action at connectors 44 permits relative movement between dock members 17 and 18 during this settling action without damaging any of the component parts and permits during realignment raising or lowering of any corner of these dock members 17 or 18 to correct the settling by using deck elevator 50 for realignment at any of the four outermost posts 22 in FIG. 1 located in water 12. Elevator 50 can even be used on one of the center posts 22 in FIG. 1 to simultaneously raise or lower both abutting ends of dock members 17 and 18, if so desired, to realign them.

It should be apparent that it is possible for a single man to erect a complete dock 10, or to add an extension dock member 18 to an existing dock member 17 then serving as a dock, while working alone and without having the inconvenience or expense of a boat, dock erection helpers, wading or swimming in the water around the dock, or getting wet. He can erect and align a complete dock every spring, and disassemble or take it in every winter or before a flood to protect it from winter or flood damage.

Also, each post clamp base element 28 may be secured to the edge of its associated deck 20 in either of two positions. Ear 48 can protect beyond the end of deck 20, as shown in FIG. 7 and on dock member 17 to connect dock member 18 thereto, or ear 48 can be the farthest portion of element 28 from the associated end of deck 20, as shown in FIG. 3 to provide a finished and smooth outer end on dock member 18. Element 28 can be moved between these two positions by merely turning it end for end, such as by rotating it in a vertical plane about a horizontal axis extending transversely of its associated deck 20.

It should be apparent that all of the component parts of dock 10 can be shipped in knocked down or disassembled condition for economy and ease of shipping; and one man, acting alone, can erect, assemble, disassemble or take in any one or all dock members 17, 18, etc. forming dock 10.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. Apparatus and structure for connecting or disconnecting an additional dock member to an existing dock member with their decks aligned for movement between an erected and aligned position and a partially erected position, and for raising or lowering and clamping or unclamping the deck of said additional dock member relative to its supporting post between an erected and aligned position and a partially erected position, comprising a dock member post clamp bracket secured to said additional dock member, comprising
a base element secured to one of said dock members and having a recess between its ends,
a post gripper element having a corresponding recess between its ends,
a pair of disengageable connecting means for detachably connecting said elements together with one of said connecting means on each side of said recesses and with said recesses being associated to embrace said dock post therebetween by a clamping action,
one of said connecting means being a bolt and nut type connector for pulling said elements into clamping relationship on said post;
a connector for operatively connecting said two dock members with their decks aligned for movement between said erected and aligned position and a partially erected position, comprising
downwardly opening socket means on the deck of said additional dock member and to be detachably engaged over an ear connector component adapted to be secured on the deck of said existing dock member,
said ear component and socket means being constructed with clearance for providing a free knee-action in a plane extending generally perpendicular to the walkway surface of their decks and extending in the same direction as at least one of said decks so that limited relative movement or misalignment of said decks can occur without damage and so that the additional dock members may be more easily erected and disassembled; and
a dock deck elevator for raising or lowering a dock deck relative to said supporting post for moving the deck of said additional dock member between said erected position and said partially erected position, comprising
a dock post bracket part,
securing means for detachably securing said bracket part to said post,
elevating means operatively connected to said bracket part and detachably connectable with the deck of said additional dock member for moving said last mentioned deck between said erected position and said partially erected position by raising or lowering said last mentioned deck contiguous to said one post.

2. Apparatus and structure, as set forth in claim 1, with
the other of said connecting means of said clamp bracket being an easily assemblable hinge means providing a fulcrum during clamping of said elements by said one connecting means,
whereby said elements will be held together by said hinge means to prevent loss when in unclamping position, and only said bolt and nut type connector need be tightened in clamping for simplicity of operation.

3. Apparatus and structure, as set forth in claim 1, with
one of said socket components being secured to said dock member post clamp bracket base element.

4. Apparatus and structure, as set forth in claim 1, with
said securing means of said deck elevator having a blind hole socket telescopically slidable over the top of said one post for detachable securement therewith,
said elevating means comprising a hook part detachably engageable with said last mentioned deck and operatively connected to said bracket part by a screw and nut connector,
said elevating means including a clevis and swivel operatively connected between at least one of said parts and said connector so that said parts do not have to pivot relatively during relative rotation of said screw and nut in said connector.

5. Apparatus and structure, as set forth in claim 1, with
the other of said connecting means of said clamp bracket being an easily assemblable hinge means providing a fulcrum during clamping of said elements by said one connecting means,
whereby said elements will be held together by said hinge means to prevent loss when in unclamping position, and only said bolt and nut type connector need be tightened in clamping for simplicity of operation,
one of said ear and socket components being secured to said dock member post clamp bracket base element.

References Cited

UNITED STATES PATENTS

| | | | |
|---|---|---|---|
| 1,238,976 | 9/1917 | Zika | 248—230 X |
| 2,610,816 | 9/1952 | Vote | 248—230 X |
| 2,618,124 | 11/1952 | Holsten | 61—48 |
| 2,765,474 | 10/1956 | Duncan | 248—230 X |
| 3,208,227 | 9/1965 | Armbrust | 61—48 |
| 2,592,448 | 4/1952 | McMenimen | 61—46.5 |
| 2,775,869 | 1/1957 | Pointer | 61—46.5 |
| 2,961,838 | 11/1960 | Vander Wilt | 61—48 |
| 3,075,252 | 1/1963 | King | 61—48 X |
| 3,455,115 | 7/1969 | Watts et al. | 61—48 |

FOREIGN PATENTS

| | | | |
|---|---|---|---|
| 598,528 | 5/1960 | Canada | 61—48 |
| 600,129 | 1948 | Great Britain. | |

JACOB SHAPIRO, Primary Examiner

U.S. Cl. X.R.

61—65; 182—144